2,004,040
DIMETHOXY-1,2-CHROMENES
Hrishikesh Pendse, Basel, Rudolf Rüegg, Bottmingen, and Gottlieb Ryser, Basel, Switzerland, assignors to Hoffmann-La Roche Inc., Nutley, N.J., a corporation of New Jersey
No Drawing. Filed Apr. 21, 1960, Ser. No. 23,627
Claims priority, application Switzerland July 15, 1959
3 Claims. (Cl. 260—345.5)

This invention relates to novel chemical compounds and to novel processes for preparing the same. More particularly, the novel compounds of the invention can be identified broadly as being certain substituted 1,2-chromenes; and the processes for making the same involve reacting a substituted 1,4-benzohydroquinone with a compound having a terminal acetylenic linkage.

The products and processes of the invention can be comprehended more readily by reference to the following diagrammatic representation. In the formulas below, the symbol R represents a lower alkyl radical, especially the methyl radical; the symbol T represents hydrogen or a lower alkanoyl radical (preferably acetyl) or the benzoyl radical; the symbol X represents a halogen atom (especially chlorine or bromine) or a hydroxyl group or a lower alkanoyloxy radical (preferably acetoxy) or the benzoyloxy radical; and the symbol $n$ represents a natural number from 0 to 9 inclusive. For convenience, numbering systems for the respective classes of compounds are indicated in the diagram. It may be mentioned that the numbering of the 1,2-chromenes (Formula III) is in accordance with "Ring Index" System No. 1038.

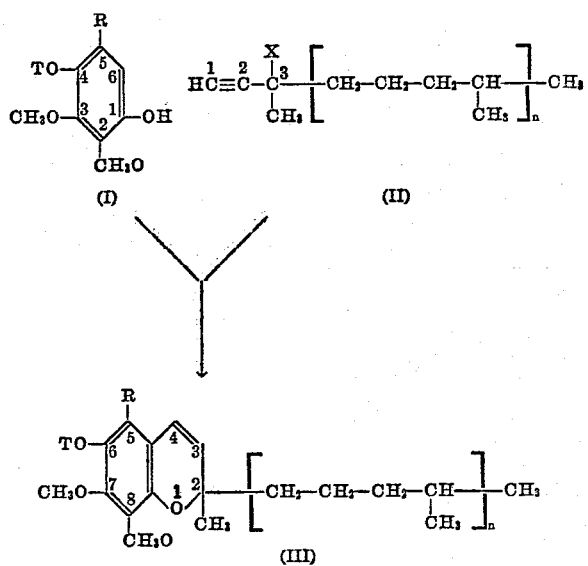

As will be apparent from the preceding diagram, the one group of starting materials, represented by general Formula I, comprises 2,3-dimethoxy-1,4-benzohydroquinones substituted in 5-position by a lower alkyl radical, preferably methyl. In lieu of the free benzohydroquinone, one can also use a 4-monoester thereof with a lower alkanoic acid or with benzoic acid, e.g. the 4-monoacetate or the 4-monobenzoate of the substituted 1,4-benzohydroquinone.

The group of starting materials represented by general Formula II can be considered as being theoretically derived from isoprene. The reactive group, i.e. hydroxyl or halogen or acyloxy, represented by the symbol X defined above, is on the No. 3 carbon atom. An acetylenic linkage is found between the No. 1 and the No. 2 carbon atoms. The reactant II can be constituted of a compound containing five carbon atoms, or of one which contains a multiple of five carbon atoms, i.e. from one to ten times five carbon atoms. Examples of suitable reactants under Formula II include the alcohols 2-methyl-3-butyn-2-ol and dehydroisophytol. In lieu of these alcohols, their respective esters with inorganic acids (e.g. dehydroisophytyl chloride and the like) or their respective esters with lower alkanoic acids or with benzoic acid (e.g. dehydroisophytyl benzoate and the like) can be employed. The condensation of the substituted 1,4-benzohydroquinone or 4-monoester thereof—represented by general Formula I—and the tertiary alcohol, or ester thereof—represented by general Formula II—is effected in the presence of an acidic condensation agent, and can be carried out under either mild or energetic reaction conditions. The reaction is preferably effected in the presence of a solvent, e.g. diethyl ether, diisopropyl ether, dioxane, benzene or petroleum ether; at temperatures between about 20° C. and about 100° C. Zinc chloride is especially suitable as an acidic condensation agent. In a preferred mode of execution, a free substituted 1,4-benzohydroquinone according to general Formula I, and a tertiary alcohol according to general Formula II, are condensed in dry benzene at a temperature of about 80° C., using zinc chloride as condensing agent.

In the case where the reactant I is an acyl derivative of a 1,4-benzohydroquinone, the hydroxy group in 4-position can be liberated by saponification or equivalent hydrolysis procedure, e.g. by treatment with bases or acids.

The novel condensation products III of the invention, obtained by the processes described, are colorless to yellow materials, and advantageously can be purified by chromatography.

The novel products of the invention are significant in the metabolism of higher organisms. For example, they exhibit a reactivating effect upon cytochrome-c-reductase. Moreover, those products of the invention which possess a free hydroxyl group are useful as antioxidants, especially for foodstuffs, feedstuffs, vitamin preparations and the like.

The invention is further disclosed in the following examples, which are illustrative but not limitative thereof. Temperatures are stated in degrees centigrade.

*Example 1*

9.1 g. of 2,3 - dimethoxy - 5 - methyl - 1,4 - benzohydroquinone, 7 g. of anhydrous zinc chloride and 100 ml. of dry benzene are heated together at reflux temperature. A solution of 16 g. of dehydroisophytol in 25 ml. of dry benezene is added slowly over a period of about ½ hour. The reaction mixture is refluxed for an additional period of about 24 hours, then cooled to room temperature and mixed with 200 ml. of ether. The benzene/ether solution is washed with water, 1 N sodium hydroxide solution, 1 N hydrochloric acid solution and then again with water. The organic layer is dried, evaporated to dryness, and the residue is dissolved in petroleum ether (boiling range 60–90°). The solution is then chromatographed on an aluminum oxide column (activity grade III). The column is washed with petroleum ether, then is eluted with petroleum ether/benzene mixtures (in proportions from 4:1 to 1:4) and pure benzene. Those fractions showing absorption maxima in the ultraviolet spectrum at 232 m$\mu$, 272 m$\mu$, 281 m$\mu$ and 330 m$\mu$ are again subjected to chromatography and distilled in a high vacuum (at 200°/0.01 mm.). In this manner there is obtained 2,5-dimethyl-2 - (4,8,12 - trimethyltridecyl) - 6 - hydroxy - 7,8 - dimethoxy-1,2-chromene as a yellow oil; ultraviolet main maximum at 272 m$\mu$; $E_1^1$=170 (in alcohol).

Example 2

1.8 g. of 2,3-dimethoxy-5-methyl-1,4-benzohydroquinone is dissolved in a mixture of 20 ml. of absolute ether and 20 ml. of absolute benzene, the solution is mixed with 0.5 mg. of anhydrous zinc chloride, and the mixture is refluxed while stirring and introducing hydrogen chloride gas. Then, over a period of 15 minutes, a solution of 1.5 g. of 2-methyl-3-butyn-2-ol in 10 ml. of absolute benzene is added dropwise. The reaction mixture is refluxed for 30 minutes, cooled and washed neutral with water. The washed solution is dried and evaporated, and the residue obtained is chromatographed with benzene on 100 g. of aluminum oxide (activity grade III). The first benzene fractions thus obtained contain the 2,2,5-trimethyl-6-hydroxy-7,8-dimethoxy-1,2-chromene which has been formed. This product is colored a pale yellow, and exhibits absorption maxima in the ultraviolet spectrum at 272 m$\mu$, 286 m$\mu$ and 327 m$\mu$.

We claim:

1. A compound represented by the formula

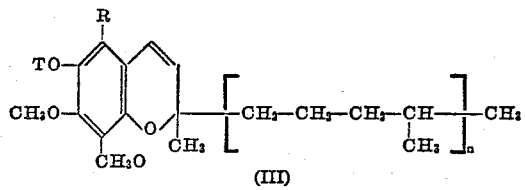

wherein the symbol R represents a lower alkyl radical; the symbol T represents a member selected from the group consisting of hydrogen, lower alkanoyl and benzoyl; and the symbol $n$ represents a natural number from 0 to 9 inclusive.

2. 2,5-dimethyl-2-(4,8,12-trimethyltridecyl)-6-hydroxy-7,8-dimethoxy-1,2-chromene.

3. 2,2,5-trimethyl-6-hydroxy-7,8-dimethoxy-1,2-chromene.

References Cited in the file of this patent

UNITED STATES PATENTS

| | | |
|---|---|---|
| 2,309,598 | Karrer et al. | Jan. 26, 1943 |
| 2,621,189 | Wiley | Dec. 9, 1952 |

FOREIGN PATENTS

| | | |
|---|---|---|
| 54,319 | Netherlands | Apr. 15, 1945 |